(12) United States Patent
Dudar et al.

(10) Patent No.: US 10,598,108 B2
(45) Date of Patent: Mar. 24, 2020

(54) METHODS AND SYSTEMS FOR OIL LEAK DETERMINATION AND/OR MITIGATION

(71) Applicant: Ford Global Technologies, LLC, Dearborn, MI (US)

(72) Inventors: Aed Dudar, Canton, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 15/921,561

(22) Filed: Mar. 14, 2018

(65) Prior Publication Data

US 2019/0285013 A1 Sep. 19, 2019

(51) Int. Cl.

| F02D 41/02 | (2006.01) |
| F02B 37/22 | (2006.01) |
| F02D 13/02 | (2006.01) |
| F02P 5/15 | (2006.01) |
| F02D 41/22 | (2006.01) |
| G06T 7/90 | (2017.01) |
| G06K 9/00 | (2006.01) |
| B60R 11/04 | (2006.01) |

(52) U.S. Cl.
CPC ............ *F02D 41/021* (2013.01); *B60R 11/04* (2013.01); *F02B 37/22* (2013.01); *F02D 13/0249* (2013.01); *F02D 41/22* (2013.01); *F02P 5/15* (2013.01); *G06K 9/00791* (2013.01); *G06T 7/90* (2017.01); *F02D 2200/02* (2013.01); *G06T 2207/10024* (2013.01); *G06T 2207/30252* (2013.01)

(58) Field of Classification Search
CPC ............... F02D 41/021; F02D 2200/02; F02D 13/0249; F02D 41/22; F02B 37/22; F02P 5/15; G06K 9/00791; B60R 11/04; G06T 2207/30252; G06T 7/90; G06T 2207/10024
See application file for complete search history.

(56) References Cited

U.S. PATENT DOCUMENTS

| 3,696,247 A | 10/1972 | McIntosh et al. |
| 4,827,760 A | 5/1989 | Saito |
| 6,723,990 B2 * | 4/2004 | DiDomenico ...... G01M 15/108 250/339.01 |
| 2003/0156020 A1 | 8/2003 | Masuda |
| 2007/0296976 A1 | 12/2007 | Jannasch |
| 2009/0219524 A1 | 9/2009 | Wang et al. |

(Continued)

FOREIGN PATENT DOCUMENTS

| CN | 103714363 A | 4/2014 |
| EP | 2495414 A1 | 9/2012 |
| JP | 2008267837 A * | 11/2008 |

OTHER PUBLICATIONS

Machine Translation of JP 2008267837 A (Izumitani) (Year: 2008).*

(Continued)

*Primary Examiner* — Brandon D Lee
(74) *Attorney, Agent, or Firm* — Geoffrey Brumbaugh; McCoy Russell LLP (57) ABSTRACT

Methods and systems are provided for a dual function imaging device. In one example, a method may comprise imaging exhaust gas outside of a reverse engine condition via the imaging device. The imaging device may image a surrounding area during the reverse engine condition.

12 Claims, 5 Drawing Sheets

(56) References Cited

U.S. PATENT DOCUMENTS

| | | | |
|---|---|---|---|
| 2014/0130493 A1* | 5/2014 | Spix | F01M 13/023 60/599 |
| 2015/0369157 A1* | 12/2015 | Lehmen | F02D 41/064 701/105 |
| 2017/0284224 A1 | 10/2017 | Ekstrand | |
| 2019/0178170 A1* | 6/2019 | Lindell | F02D 41/22 |

OTHER PUBLICATIONS

Dudar, A. et al., "Methods and Systems for Oil Leak Determination and/or Mitigation," U.S. Appl. No. 15/921,525, filed Mar. 14, 2018, 51 pages.

* cited by examiner

METHODS AND SYSTEMS FOR OIL LEAK DETERMINATION AND/OR MITIGATION

FIELD

The present description relates generally to mitigating oil leaks and/or determining a present oil leak via an imaging device.

BACKGROUND/SUMMARY

Vehicle lubrication systems may comprise one or more components for sealing the lubrication system from other systems of a vehicle, including a coolant system, a fuel system, and the like. However, due to varying pressures of each of these systems in combination with changing engine operating parameters, leaks may occur.

One example of such a leak may include oil leaking from the lubrication system into the exhaust gas through one or more of the intake system and combustion chambers of the engine. Due to the high molecular weight of lubricating oil compared to gasoline and diesel, lubricating oils may deposit onto waterways and other earthly surfaces rather than dissipating to the atmosphere. While both fuel and oil emissions are undesired, combustion of lubricating oils may present a more immediate environmental impact. Furthermore, lubricating oils may be less flammable than combustion fuels, allowing the lubricating oils to coat surfaces of an exhaust system and degrade aftertreatment devices arranged therein.

Other attempts to address oil leaking into combustion components of a vehicle include coupling a spectrometer to an exhaust gas outlet of the vehicle. A color of the exhaust gas smoke may be estimated based on feedback from the spectrometer, wherein the color corresponds to one or more constituents arranged in the exhaust gas.

However, the inventors herein have recognized potential issues with such systems. As one example, oil leaks may degrade a multitude of vehicle components and determination of a leak while visiting a mechanic may be too infrequent to prevent other vehicle degradations. Alternatively, coupling a spectrometer to the vehicle may be expensive and increase packaging constraints. Furthermore, the conditions exposed to the spectrometer (e.g., temperature, humidity, airborne particles, etc.) may degrade the spectrometer, further burdening a vehicle operator.

In one example, the issues described above may be addressed by a method comprising adjusting at least one engine operating parameter in response to an oil leak and a pressure of a crankcase being within a threshold of an exhaust gas pressure, the oil leak based on an exhaust gas color sensed via a reverse camera. In this way, the oil leak may be mitigated onboard without seeking maintenance.

As one example, the camera may capture one or more images of the exhaust gas, wherein the images may be integrated and compared to a wavelength spectrum. A color of the exhaust gas may illustrate a type of system fluid leak. For example, an oil system leak into combustion components of the vehicle may generate at least partially blue exhaust gas. It may be determined that the oil was leaking during non-boosted engine conditions and it may be desired to increase exhaust gas pressure to mitigate oil leaks from a crankcase or intake and exhaust valves.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to determining and/or mitigating fluid leaks into an engine system. The engine system may be included in a hybrid vehicle, such as the hybrid vehicle of FIG. 1. The engine system may further comprise one or more of a turbocharger, intake and exhaust valves, a crankcase, coolant passages, and the like. The engine system may develop one or more leaks, wherein the leak may be determined via analyzation of an exhaust gas color. The hybrid vehicle is further illustrated in FIG. 2, wherein the hybrid vehicle is shown comprising an imaging device. In the example of FIG. 2, the imaging device may be a reverse camera. When the vehicle is in a reverse gear, the reverse camera may project an image of a surrounding area adjacent to the vehicle. The surrounding area may be within a reverse threshold range (e.g., between 0.5 to 3 meters away from a rear of the vehicle). Outside of the reverse gear, the reverse camera may be configured to visualize exhaust gas. Thus, the reverse camera may focus on an exhaust gas threshold range (e.g., less than 0.5 meters away from the rear of the vehicle).

Figure 3:
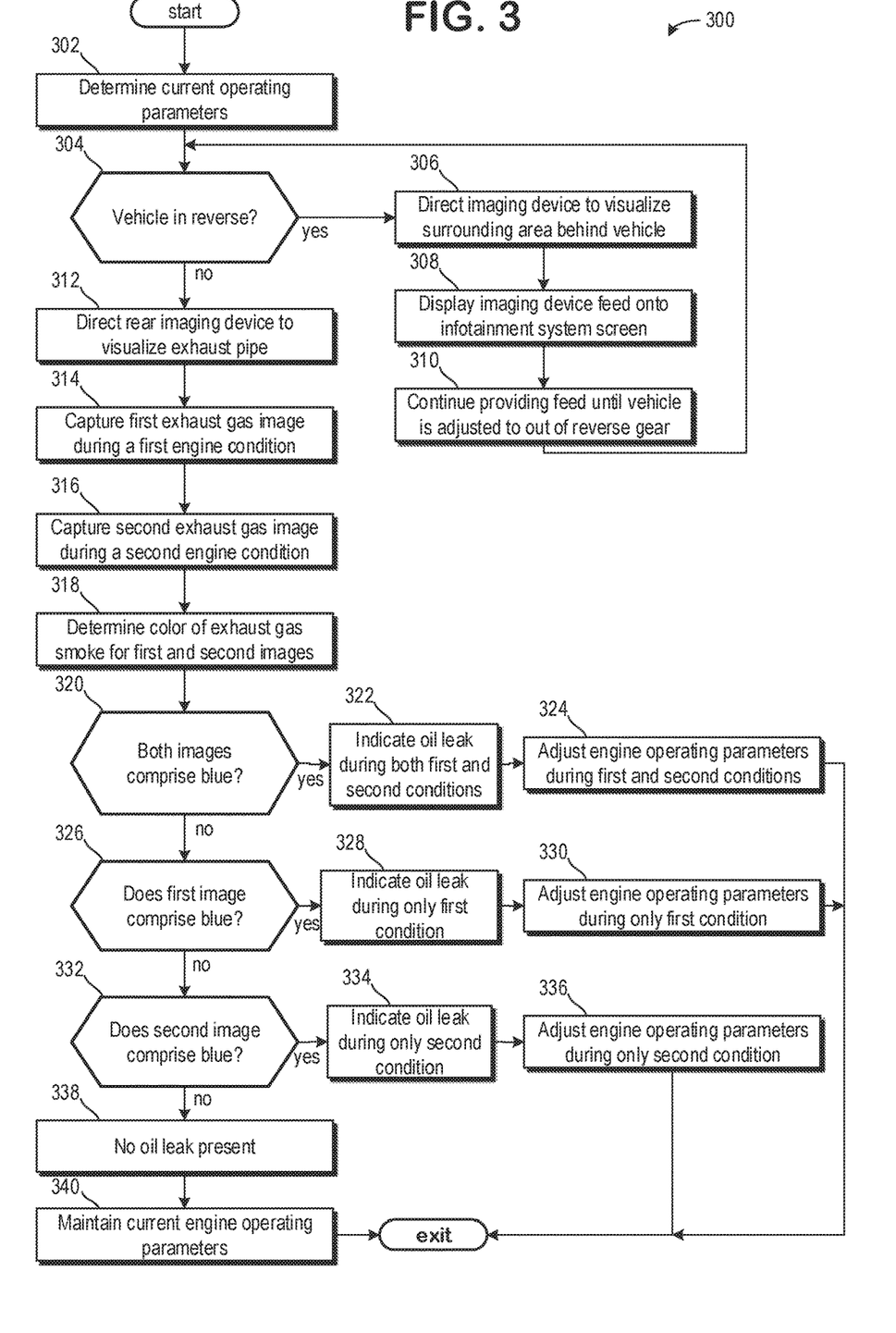
FIG. 3 shows a method for visualizing the exhaust gas smoke.

A controller of the engine system may comprise instructions stored on non-transitory memory thereof that when executed enable to controller to direct the reverse camera toward the vehicle tailpipe(s), capture one or more images of the exhaust gas, and analyze an amount of blue in the exhaust gas. Prior to analyzing the blue, the controller may integrate and apply one or more filters to the images. If the amount of blue is greater than a threshold amount of blue, then it may be determined that oil is leaking into one or more engine system components. Additionally, by visualizing exhaust gas during non-boosted and boosted engine conditions, it may be determined if oil is leaking during only boosted, non-boosted, or both engine conditions. FIG. 3 illustrates a method for visualizing the exhaust gas during boosted and non-boosted engine conditions and determining if an oil leak is present.

If the oil leak is present, then one or more engine operating parameters may be adjusted. For example, the imaging device may present a live feed of the exhaust gas onto a screen of an infotainment system. Additionally, an indicator lamp may be activated to indicate to a vehicle operator that maintenance is desired. Furthermore, one or more engine operating parameters may be adjusted to mitigate and/or prevent the oil leak.

Figure 4:
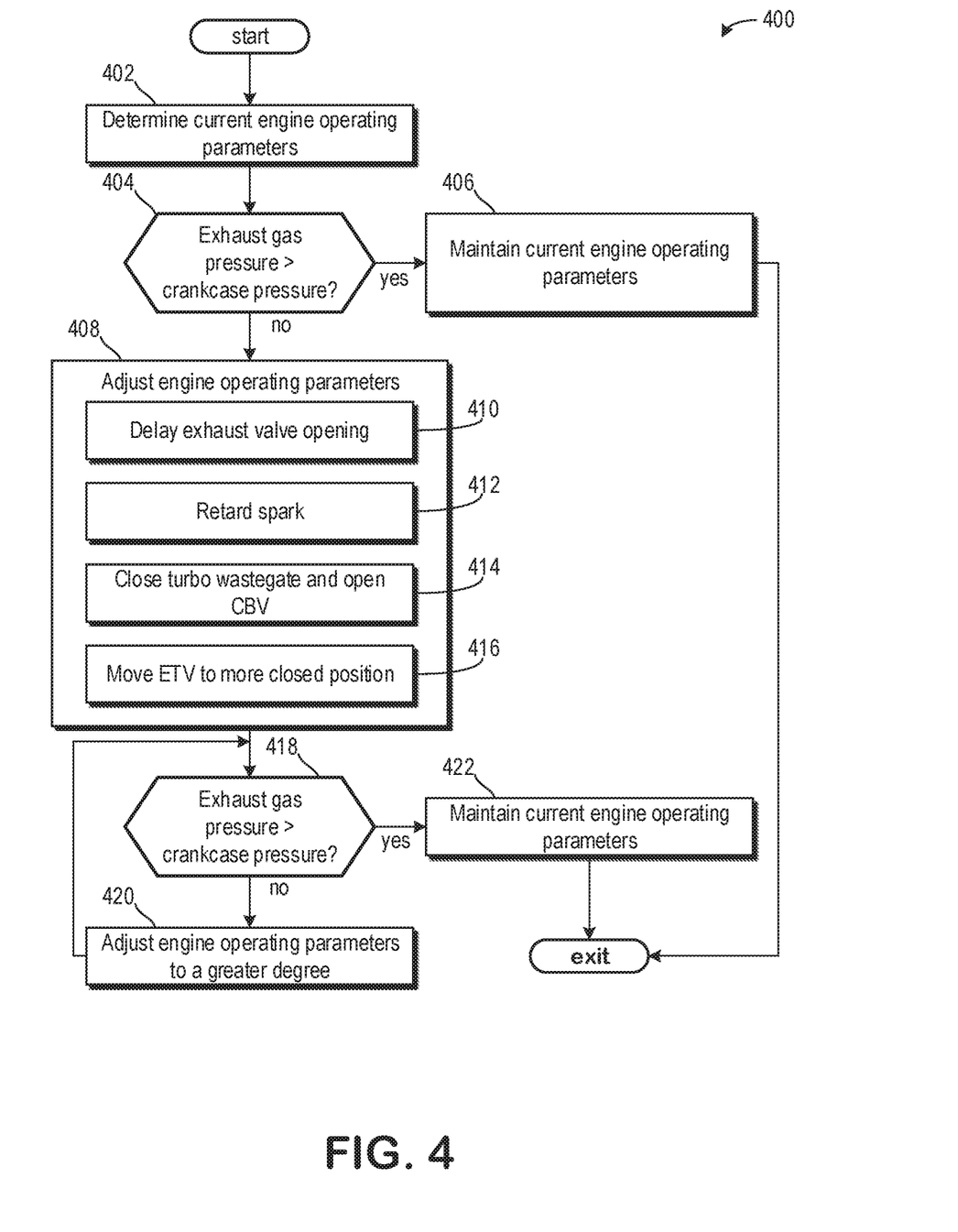
FIG. 4 shows a method for mitigating oil leaks during boosted conditions.

Additionally or alternatively, engine operating parameters may be adjusted prior to determination of an oil leak. That is to say, engine operating parameters may be preemptively adjusted in response to one or more current engine conditions which may be associated with an oil leak. FIG. 4 illustrates a method for monitoring engine conditions which may be associated with an oil and adjusting engine operating parameters in response to the conditions. Furthermore, the adjustments of FIG. 4 may be applied in response to the determination of the oil leak during the method of FIG. 3.

Figure 1:
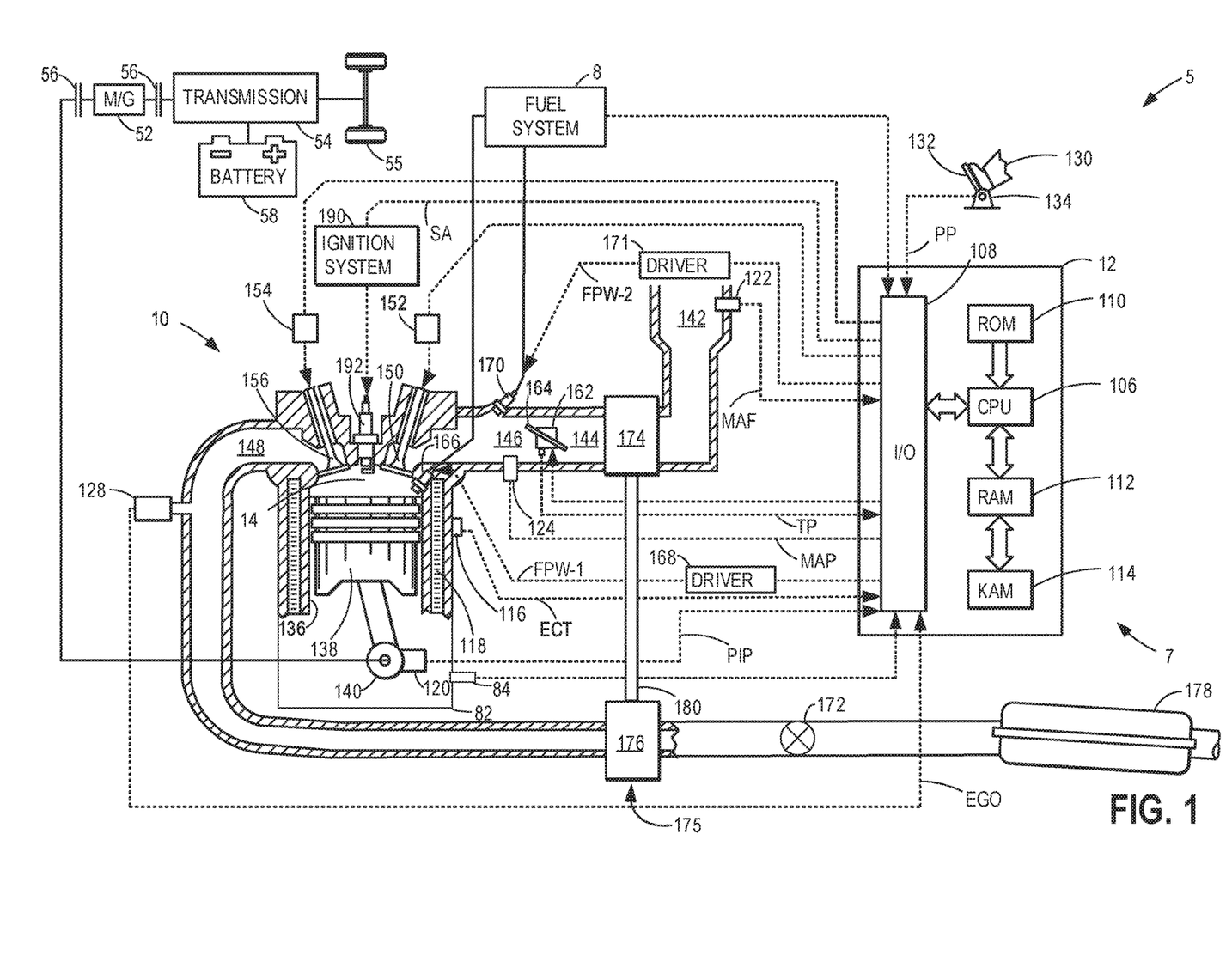
FIG. 1 shows an engine system schematic of a vehicle.
Figure 2:
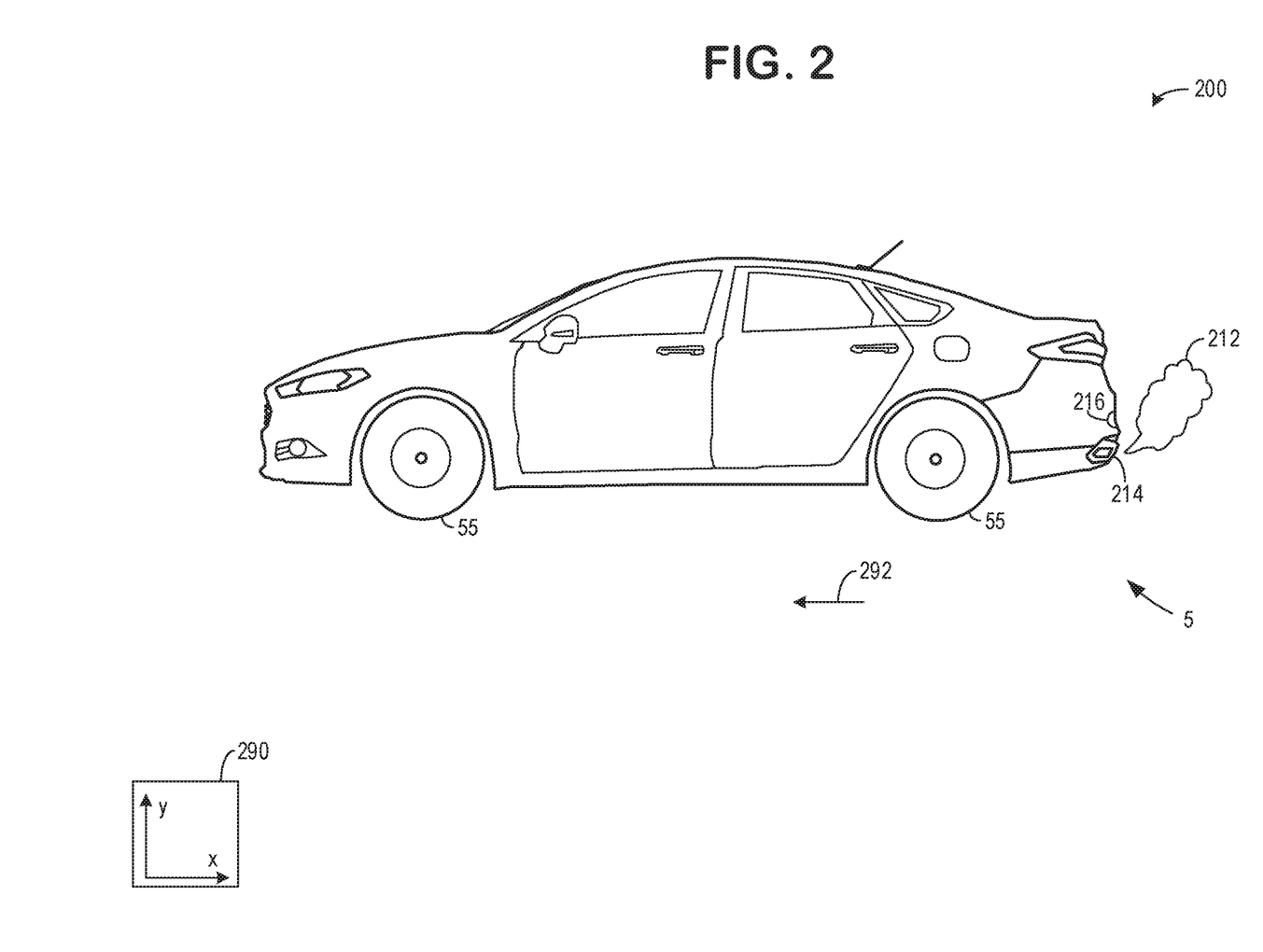
FIG. 2 shows the vehicle propelling visualizing exhaust gas smoke.
Figure 5:
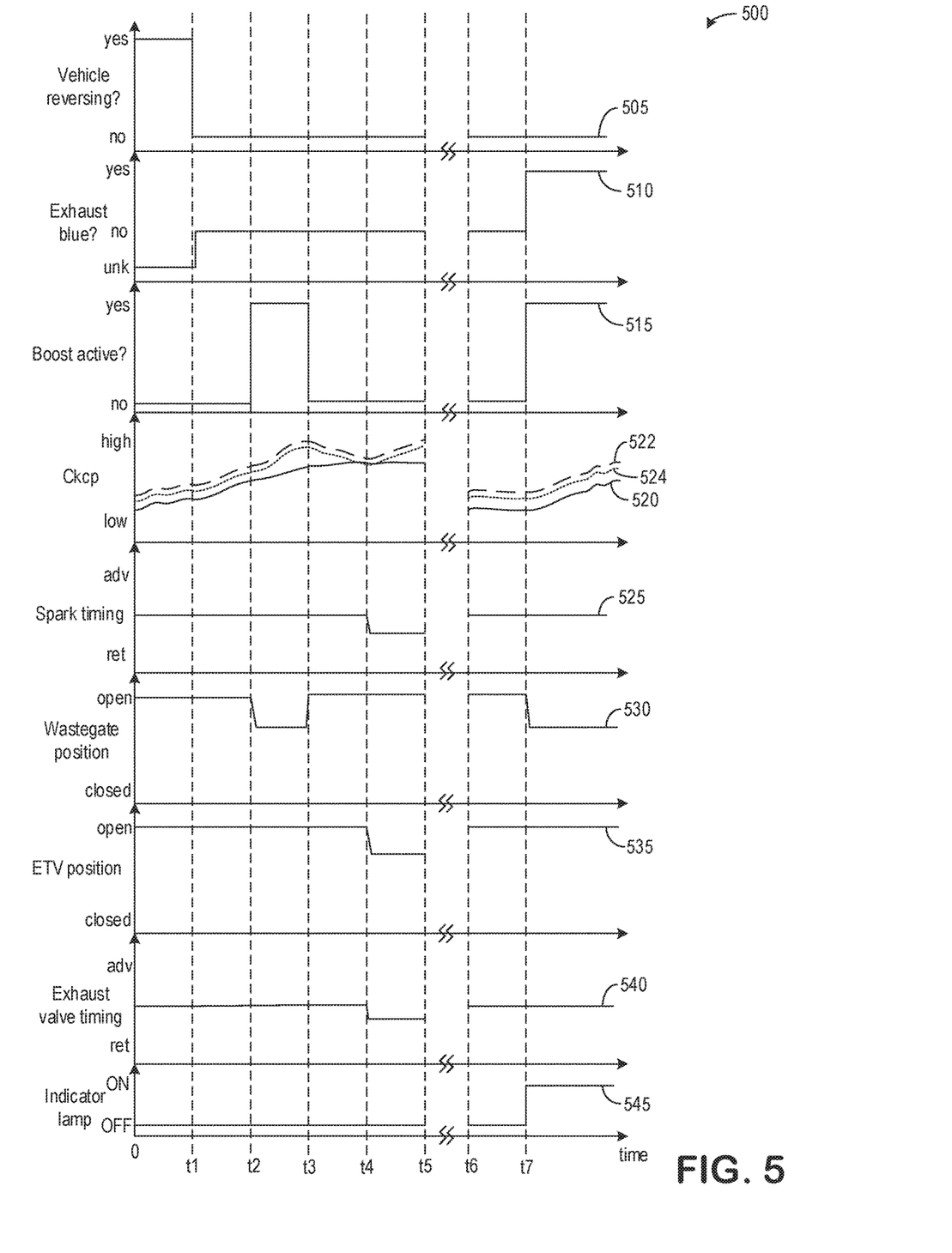
FIG. 5 shows an engine operating sequence illustrating a combination of the methods of FIGS. 3 and 4 executed in combination with the engine system of FIG. 1.

An engine operating sequence illustrating the methods of FIGS. 3 and 4 being executed in combination with the engine system of FIG. 1 is shown in FIG. 5.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 depicts an example of a cylinder of internal combustion engine 10 included by engine system 7 of vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

One or more portions of the crankshaft 140 may be lubricated via oil housed in a crankcase 82. The crankcase 82 may be sized such that the crankshaft 140 may be actuated according to a full oscillation of the piston (e.g., from TDC to BDC or vice-versa). The crankcase 82 may be further coupled to a lubrication system of the engine. Thus, oil or other lubricants may enter and depart the crankcase 82. A sensor 84 may be configured to monitor a condition of the crankcase 82 and provide feedback to the controller 12. The sensor 84 may be configured to monitor one or more of a pressure, temperature, humidity, and the like. Herein, the sensor 84 is a pressure sensor.

Cylinder 14 can receive intake air via a series of intake air passages 142, 144, and 146. Intake air passage 146 can communicate with other cylinders of engine 10 in addition to cylinder 14. FIG. 1 shows engine 10 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

An exhaust tuning valve 172 may be arranged between the turbine 176 and the emission control device 178. The exhaust tuning valve 172 may be actuated to adjust exhaust backpressure. For example, the exhaust tuning valve 172 may be configured to partially obstruct the exhaust passage 148 such that less exhaust gas may flow past the exhaust tuning valve 172. The exhaust tuning valve 172 may be actuated to more closed positions to increasingly obstruct the exhaust passage 148. In turn, this may increase the exhaust backpressure, which may decrease a likelihood of oil leaking from the crankcase 82.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Lubricated portions of the engine system 7 may include the turbocharger 175, the intake valve 150, the exhaust valve 156, and the crankshaft 140. Each of these components may be prone to degradation, wherein the degradation may include an oil leakage. For example, compressor bearings may be lubricated to mitigate metal on metal contact. However, due to high rotation speeds of the compressor (e.g., 20,000 revolutions-per-minute), the oil may get foamy. If the oil remains foamy upon return to an oil reservoir, then a pump may be unable to flow the oil to the compressor bearing. This may result in metal on metal contact, which may lead to a crack or hole. This may leak oil upon a future lubrication of the compressor bearing, thereby leading to oil flowing to the cylinder 14.

As another example, the crankcase 82 may flow oil into the cylinder 14 during some engine operating conditions. For example, if a crankcase pressure is within a threshold pressure of a current exhaust gas pressure, then oil from the crankcase 82 may flow past the piston 138 and into the cylinder 14. The crankcase pressure may be estimated based on feedback from the sensor 84 to the controller 12. To prevent oil flowing from the crankcase 82 to the cylinder 14, one or more engine operating parameters may be adjusted to increase an exhaust gas temperature and/or decrease the crankcase pressure.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from an energy storage device 58 (herein, battery 58) to provide torque to vehicle wheels 55. Electric machine 52 may also be operated as a generator to provide electrical power to charge battery 58, for example during a braking operation. In some examples, the electric machine 52 may be coupled to the turbine 176, as will be described in greater detail below.

The controller 12 receives signals from the various sensors of FIG. 1 and employs the various actuators of FIG. 1 to adjust engine operation based on the received signals and instructions stored on a memory of the controller. For example, adjusting engine operating parameters may include adjusting an actuator of the exhaust valve 156, an actuator of the spark plug 192, and an actuator of the fuel injector 166 in response to feedback from the sensor 84.

Turning now to FIG. 2, it shows an embodiment 200 of the vehicle 5. As such, components previously introduced may be similarly numbered in subsequent figures. The vehicle 5 is shown having its wheels 55 arranged on a ground. The vehicle 5 may comprise one or more of an infotainment system, a navigation system, and an entertainment system arranged within a vehicle cabin where vehicle occupants may reside.

An axis system 290 is shown comprising two axes, namely an x-axis parallel to a horizontal direction and a y-axis parallel to a vertical direction. A direction of vehicle movement 292 may be substantially parallel to the x-axis. Specifically, the direction of vehicle movement 292 illustrates a forward direction of vehicle movement. The forward direction may be achieved when the vehicle is in a "drive" gear. The drive gear may include a vehicle transmission being in a first gear or higher. Thus, the drive gear may not be in a reverse gear when the vehicle 5 is moving in the forward direction 292. As an example, the vehicle 5 may move in a direction opposite the forward direction 292 when the vehicle 5 is in a reverse gear.

The vehicle 5 may emit exhaust gas 212 through one or more tailpipes 214 when an engine (e.g., engine 10 of FIG. 1) is combusting. An image of the exhaust gas 212 may be captured by an imaging device 216. The imaging device 216 may be a camera and/or video recorder arranged on a rear of the vehicle. The imaging device 216 may be one or more of a reverse camera, blind-spot camera, and bird's eye view camera. The bird's eye view camera may include a plurality of cameras configured to capture a 360° image of the vehicle such that an overhead view of the vehicle may be provided to a vehicle operator. In this way, the imaging device 216 may be a single camera of the plurality of cameras arranged on a rear of the vehicle 5. At any rate, the imaging device 216 may be a camera arranged on a rear of the vehicle 5, wherein the camera may comprise a function other than imaging exhaust gas 212. In some examples, the imaging device 216 may be an imaging device solely devoted to imaging exhaust gas and may not provide any other function.

Herein, the imaging device 216 is a reverse camera, wherein the camera is configured to capture a surrounding area adjacent the vehicle 5. More specifically, the imaging device 216 may capture a first surrounding area when the vehicle 5 is in a reverse gear. The first surrounding area may comprise an area within 0.5 to 4 meters away from the rear end of the vehicle 5. As such, the tailpipe(s) 214 and exhaust gas 212 may not be included in the image of the first surrounding area. Outside of the reverse condition, the imaging device 216 may capture a second surrounding area, wherein the second surrounding area may comprise an area less than 0.5 meters away from the rear end of the vehicle 5. Thus, the tailpipe(s) 214 and the exhaust gas 212 may be included in the second surrounding area. Outside of the reverse driving condition also refers to a non-reverse driving condition.

In some examples, a number of imaging devices 216 may be equal to a number of tailpipes 214. Thus, if there are two tailpipes 214, then there may be two imaging devices 216. In some examples, there may be only one imaging device of the imaging devices 216. The one imaging device may be able to visualize exhaust gas being emitted from each of the tailpipes 214. As such, the one imaging device may be arranged in a location between the tailpipes 214. In some examples, the imaging devices 216 may be arranged at a rear bumper, adjacent a license plate, adjacent a rear door, and/or adjacent one or more taillights. The rear door may be a door which provides access to a vehicle trunk or to a vehicle engine, depending on a layout of the vehicle (e.g., front engined or rear engine, respectively). For a vehicle with the engine adjacent its front wheels, the rear door may open to a trunk, where the vehicle operator may store one or more items.

The imaging device 216 may comprise one or more features configured to assist the imaging device 216 to capture an image of the exhaust gas 212 with increased quality. These features may include one or more of a servomotor, infrared, and light. For example, the servomotor may allow the imaging device 216 to rotate, thereby increasing an imaging range of the imaging device 216. In this way, the imaging device 216 may not be fixed, but rather, may be able to rotate around and within a 360° plane. In some examples, additionally or alternatively, the imaging device 216 may comprise infrared features such that the imaging device 216 may capture images during nighttime. This may be beneficial during instances where the taillights are not bright enough or when the taillights are not illuminating a desired area. In this way, the imaging device 216 may not be reliant on the taillights to capture a quality image, wherein the quality image may sufficiently focus on exhaust gas. This may include determining that a color saturation of an image will be greater than a threshold quality, which may be based on a non-zero value. If the color saturation is less than the threshold quality, then the infrared may be activated and/or the camera may be actuated by a controller signal to an actuator of the servomotor to actuate the camera. In one example, the threshold quality is based on a confidence factor calculated based on images captured by the imaging device 216 compared to images captured by a camera and/or video that is not coupled to the vehicle 5.

The imaging device 216 may capture images of the exhaust gas 212 during some engine operating parameters. As an example, the imaging device 216 may capture images of the exhaust gas during engine conditions outside of a reverse condition. This may include engine stops, idle, low load, high load, and the like. Thus, the imaging device 216 may function as a reverse camera during a reverse operation of the vehicle 5, while operating as an exhaust gas visualization device during other engine operating conditions. In this way, the imaging device 216 may be configured to display an image of a surroundings of the vehicle 5 or an image of the exhaust gas 212 to a screen in the vehicle 5. The screen may be included in a navigation system and/or infotainment system of the vehicle 5, wherein the screen is arranged in the vehicle cabin for the vehicle occupants to see. Additionally or alternatively, the image may be sent to a mobile device belonging to the vehicle operator.

The image of the exhaust gas 212 may be captured by the imaging device 216, wherein the image may be processed via routine stored in non-transitory memory of a controller (e.g., controller 12 of FIG. 1). The routine, such as the method of FIG. 3, may apply one or more filters to the image to determine a color of the exhaust gas 212. Based on a determined color, the routine may be able to diagnose one or more leaks of engine components, if any. As an example, if the exhaust gas comprises a threshold amount of blue, then oil may be leaking through one or more of a valve seal, a piston ring, and/or a turbo seal. Additionally, a time at which the exhaust gas is imaged may be characteristic of certain types of leaks. Continuing with the example above, if a threshold amount of blue is in the exhaust gas during an engine start, then it may be determined that oil is leaking through the valve seal. However, if the exhaust gas is blue outside of the engine start and not during the engine start, then it may be determined that oil is leaking past the piston ring. As another example, if exhaust gas comprises a threshold amount of white, then coolant may be leaking into the combustion chamber via one or more of a head gasket, cylinder head, and engine block. A method for capturing images of the exhaust gas, along with determining its color will be described below.

Turning now to FIG. 3, it shows a method 300 for capturing exhaust gas images via an imaging device and determining a color of the exhaust gas. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

As an example, the method 300 may be implemented using the various components described above with respect to FIGS. 1 and 2. Specifically, the method 300 may utilize the imaging device 216 of FIG. 2. The imaging device 216 may capture one or more images of exhaust gas, wherein the controller may apply one or more filters to the captured images to determine a color of the exhaust gas, if any, based on the method 300. It will be appreciated that the method 300 may also be implemented with vehicle system other than the embodiments of FIGS. 1 and 2.

The method 300 begins at 302, which includes determining, estimating, and/or measuring current engine operating parameters. Current engine operating parameters may include, but are not limited to, one or more of throttle position, engine temperature, engine speed, manifold pressure, vehicle speed, exhaust gas recirculation flow rate, and air/fuel ratio.

The method 300 may proceed to 304, which may include determining if the vehicle is in reverse. The vehicle may be in reverse if a reverse gear is selected and/or if the vehicle is moving in a reverse direction (e.g., opposite the forward direction of vehicle movement 292 of FIG. 2). If the vehicle is in a reverse gear and/or is moving in a reverse direction, then the method 300 may proceed to 306, which may include directing the imaging device to visualize a first surrounding area behind the vehicle. The surrounding area behind the vehicle may include an area adjacent a rear of the vehicle (e.g., between 1 to 5 meters). This may further include where the imaging device does not capture images of the exhaust gas and/or exhaust tailpipes.

The method 300 may proceed to 308, which may include displaying an imaging device feed onto a screen of an infotainment system in a vehicle cabin. As such, a live feed of the imaging device may be projected onto the screen of the infotainment system to a vehicle operator, wherein the live feed includes the first surrounding area.

The method 300 may proceed to 310, which may include continuing to provide the imaging device feed until the vehicle is adjusted out of the reverse gear. This may include shifting from the reverse gear to a drive gear, neutral, park, or the like.

Returning to 304, if the vehicle is no longer in reverse and is in a different gear (e.g., drive, neutral, or park), then the method 300 may proceed to 312, which may include directing the rear imaging device toward tailpipe(s). Thus, the imaging device may visualize a second surrounding area, closer to the vehicle than the first surrounding area. This may include adjusting a position of the imaging device and/or adjusting a focus of the imaging device. As an example, the imaging device may be actuated to visualize an area within the threshold distance of the rear of the vehicle. This may include actuating the imaging device such that one or more tailpipes of the rear may be visible within a range of the imaging device. Additionally or alternatively, one or more setting of the imaging device may be adjusted such that the focus is changed. This may include adjusting one or more of an aperture, shutter speed, ISO, exposure, zoom, and the like. For example, by increasing the ISO, the imaging device is more sensitive to light. As another example, increasing the aperture may increase a proximal focus. That is to say, by increasing the aperture, objects closer to the imaging device may be in greater focus than objects farther from the imaging device.

In some examples, additionally or alternatively, the vehicle may be an autonomous vehicle, wherein the vehicle may independently adjust its position to increase a quality of an image captured of the second surrounding area. This may include the vehicle actuating in forward, reverse, and/or angular (e.g., turning) directions to increase the image quality. The image quality may be dependent on sun light, wind, and other weather conditions. In this way, the vehicle may independently adjust its position to improve image quality of the second surrounding area without vehicle operator inputs.

The method 300 may proceed to 314, which may include capturing a first exhaust gas image during a first engine condition. The first engine condition may be a non-boosted engine condition or a boosted engine condition. The non-boosted engine condition may include a naturally aspirated engine condition where boost air from a compressor does not flow to the engine. Thus, the boosted engine condition may include an engine condition where boost air from the compressor does flow to the engine. This may include a snapshot or a video clip. The snapshot may be a still-image. The video clip may be a video of the exhaust gas, wherein the video may be for a threshold duration (e.g., 1 to 10 seconds). In one example, the video clip is exactly three seconds long. In some examples, additionally or alternatively, the first exhaust gas image may include a plurality of images captured rapidly over a short period of time (e.g., one to two seconds). Herein, the first engine condition is a non-boosted engine condition.

The method 300 may proceed to 316, which may capturing a second exhaust gas image during a second engine condition. The second engine condition may be unequal to the first engine condition such that if the first engine condition is a non-boosted engine condition, then the second engine condition is a boosted engine condition. Herein, the second engine condition is a boosted engine condition. Additionally or alternatively, the method may prioritize capturing exhaust gas images of the second engine condition under high boost conditions (e.g., hard tip-in).

The method 300 may proceed to 318, which may include determining a color of each of the first and second images. Prior to determining the color of the images, the images may be transformed via a first or second transformation.

The first transformation may include converting the first exhaust gas image and the second exhaust gas image into first and second frequency domains via fast Fourier transform (FFT). The first and second frequency domains may be passed through a frequency corresponding to a color blue. In one example, the frequency corresponding to the color blue may be a range spanning 606 to 668 terahertz (THz). First and second amplitudes may be associated with the first and second frequency domains, the first and second amplitudes corresponding to an amount of blue in each of the first and second exhaust gas images, respectively. In some examples, any amount of blue may be associated with an oil leak. In other examples, additionally or alternatively, the first and second amplitudes may be compared to a threshold amplitude, wherein the threshold amplitude corresponds to an amount of blue in exhaust gas produced from oil being present in exhaust gas. As such, if the first and/or second amplitudes are greater than or equal to the threshold amplitude, then an oil leak may be present. The threshold amplitude may be empirically determined via analyzing exhaust gas with some amount of oil therein, wherein the amount of oil corresponds to an average amount of oil occurring during an oil leak.

The second transformation may include integrating the first and second exhaust gas images over time by using a match filter. The match filter may compare the first and second exhaust gas images to previously obtained exhaust gas image comprising known amounts of blue smoke. A blue smoke amplitude of the first exhaust gas image may be compared to a blue smoke amplitude of the second exhaust gas image. As described above, the first exhaust gas image may be captured during a non-boosted engine condition and the second exhaust gas image may be captured during a boosted engine condition. Thus, if the blue smoke amplitudes of the first exhaust gas image and the second exhaust gas image are substantially similar, then a degradation may be present where engine oil is leaking into the exhaust gas during non-boost and boosted engine conditions. This may include oil leaking past a valve or piston seal. However, if the blue smoke amplitudes of the first exhaust gas image and the second exhaust gas image are unequal. As an example, if the blue smoke amplitude of the second exhaust gas image is greater than the blue smoke amplitude of the first exhaust gas image, then oil may be leaking during only boosted conditions. This may indicate a turbo seal degradation.

In some examples, the integrating may include a differential image comparator filter technique operated on each pixel of the captured image. The differential image comparator filter may identify a change in the blue and/or white smoke color being added onto an image captured prior to the acceleration from a stop. In some examples, a comparison between exhaust gas from a stopped idling vehicle and an acceleration from a stop of the same vehicle may demonstrate a greatest shift in exhaust gas color. That is to say, the acceleration away from a stopped idling vehicle may produce an amount of smoke due to oil burning in the exhaust.

Thus, the method may include capturing an image at a stop, prior to an acceleration, (e.g., a base image) and compare it to an image captured as the vehicle accelerates from the stop (e.g., an acceleration image). The acceleration image may first be adjusted to a same image footprint as a camera distance changes with the vehicle movement. That is to say, the base image may comprise a constant image footprint, while the acceleration image may experience a changing image footprint as the camera distance increases with vehicle movement. Following adjusting of the image footprint of the acceleration image, the base image may be removed from the acceleration image, thereby leaving a pixel contribution of the exhaust gas from only the acceleration. That is to say, a base exhaust color may be filtered out of the acceleration image to allow only the exhaust gas color produced in response to the acceleration to remain in the acceleration image. The intensity of the smoke can then be determined by integrating the pixels red, green, and blue (RGB) contributions, in a specified range, and comparing these to respective intensity thresholds. This comparison to the "base image" method may be repeated throughout the vehicle acceleration, as the smoke tends to increase as the vehicle accelerates. Once the acceleration is complete, an amount of blue in the exhaust gas smoke may be estimated.

Additionally or alternatively, each image pixel may comprise three intensity values for each of the RGB contributions. The desired color combination ranges of RGB may be specified prior to an acceleration and/or vehicle start and the differential image may be filtered to pass through only the desired color combination ranges. The intensity integration may operate on this color filtered image representation. However, it will be appreciated that the intensity values may not be analyzed until the base image is filtered out of the acceleration image.

The method 300 may proceed to 320, which may include determining if both images comprise blue. This may be determined by comparing blue amplitudes of the first exhaust gas image and the second exhaust gas image to the threshold amplitude. If amplitudes of both the first exhaust gas image and the second exhaust gas image are greater than the threshold amplitude, then it may be determined that both images comprise blue and the method 300 may proceed to 322, which may include indicating an oil leak is occurring during both the first and second engine conditions. The indicating may include activating an indicator lamp alerting a vehicle operator that vehicle maintenance is desired.

The method 300 may proceed to 324, which may include adjusting engine operating parameters during the non-boosted and boosted engine conditions in response to the engine leak. As an example, the adjusting may include adjusting one or more of a compression ratio of the engine cylinders, an engine power output, a fuel injection volume and timing, boost, exhaust valve timing, spark timing, and an intake air flow. For example, oil leaking into the combustion chambers may decrease a compression of the engine cylinders, thus, it may be desired to increase the compression ratio of the engine cylinders in response to the oil leak. Additionally or alternatively, engine power output may be decreased in response to the oil leak, wherein decreasing the engine power output may include decreasing the fuel injection volume and/or decreasing the intake air flow (e.g., moving the throttle to a more closed position). As such, the controller may signal to an actuator to move the throttle to a more closed position, such that intake air flow decreases. Additionally, the controller may signal to an actuator of the fuel injector to inject less fuel.

Returning to 320, if a blue amplitude of one or more of the first and second exhaust gas images is not greater than or equal to the threshold amplitude, then both the first and second exhaust gas images do not comprise blue. The method 300 may proceed to 326 to determine if the first exhaust gas image comprises blue. The first exhaust gas image may comprise blue if the blue amplitude of the first exhaust gas image is greater than or equal to the threshold amplitude. If the blue amplitude of the first exhaust gas image is greater than the threshold amplitude, then oil may be leaking during non-boosted engine conditions.

The method 300 may proceed to 328 to indicate that oil is leaking during only the first condition. As a result, oil may not be leaking from a turbo seal. As an example, oil may be leaking from the crankcase to the combustion chamber. Additionally or alternatively, oil may be leaking past a valve seal. The indicating may further include activating an indicator lamp, the indicator lamp expressing a vehicle maintenance is desired.

The method 300 may proceed to 330, which may include adjusting engine operating parameters during only the first engine condition (e.g., the non-boosted engine conditions). The adjustments may include adjusting one or more of a piston oscillating range, an exhaust valve timing, and spark timing.

Additionally or alternatively, the exhaust valve timing may be delayed to increase an exhaust gas pressure. More specifically, it may be desired to increase the exhaust gas pressure to a pressure at least greater than a crankcase pressure by a threshold pressure. The threshold pressure may be greater than 0.5 kPa. In one example, the threshold pressure is exactly 2.0 kPa. As such, it may be desired that the exhaust gas pressure be at least greater than the crankcase pressure by 2.0 kPa. The delaying of the exhaust valve timing may be based on a difference between the crankcase pressure and the exhaust gas pressure, wherein as the difference decreases, the exhaust valve timing may be increasingly delayed. By delaying the exhaust valve timing, the exhaust pressure may increase, thereby decreasing a likelihood of oil flowing from the crankcase to the combustion chamber. Additionally or alternatively, the spark timing may be retarded such that combustion may be delayed. The retarded spark timing may further include retarding an intake valve opening to prevent blow through gases from the intake manifold directly into the exhaust passage.

As another example, adjusting the piston oscillating range may include decreasing the range in which the piston may oscillate such that a distance between top-dead center (TDC) and bottom dead center (BDC) may be reduced. By decreasing the range of the piston, less blow-by gases may flow to the crankcase and a crankcase pressure may be correspondingly reduced, thereby decreasing oil leaking from the crankcase to the combustion chamber. As such, based on current engine operating parameters, it may be desired to either increase exhaust gas pressure or decrease crankcase pressure. For example, it may be difficult to sufficiently increase exhaust gas pressure outside of boost conditions, as such, it may be desired to decrease crankcase pressures by decrease blow-by gas flow to the crankcase.

Returning to 326, if the blue amplitude of the first exhaust gas image is less than the threshold amplitude, then an oil leak may not be present during non-boosted engine conditions. The method 300 may proceed to 332, which may include determining if the second exhaust gas image comprises blue. If the blue amplitude of the second exhaust gas image is greater than or equal to the threshold amplitude, then an oil leak may be present during boosted engine conditions.

The method 300 may proceed to 334 to indicate an oil leak during only the second condition. As such, the oil leak is associated with boosted conditions, and therefore may indicate a degradation of a turbo seal. The indicating may include activating an indicator lamp thereby expressing to a vehicle operator that vehicle maintenance is desired.

The method 300 may proceed to 336 to adjust engine operating parameters during only the second engine condition. The adjusting may include adjusting boost. Adjusting boost may include adjusting an opening of a wastegate. For example, the controller may determine a control signal to send to a wastegate actuator. The opening may be dependent on a magnitude of the oil leak, wherein the magnitude increases as a difference between the blue amplitude and the threshold amplitude increases. As the magnitude increases, the wastegate opening may also increase. In some examples, the turbo may be completely deactivated such that boost no longer flow to the engine.

Returning to 332, if the blue amplitude of the second exhaust gas image is less than the threshold amplitude, then the method 300 may proceed to 338, which may include determining that no oil leak is present. As such, the oil may not be leaking during each of the first and second engine conditions. The method 300 may proceed to 340, which may include maintaining current engine operating parameters and does not adjust engine operating parameters in response to an oil leak.

Turning now to FIG. 4, a method 400 for mitigating oil leaks during one or more engine operating conditions. The controller (e.g., controller 12) may signal to one or more actuators of various engine system components to adjust an operation of the component such that in cylinder pressures may increase to mitigate oil leak from a crankcase into exhaust gas flow.

The method 400 begins at 402, which includes determining current engine operating parameters. The current operating parameters may include engine temperature, engine speed, manifold pressure, throttle position, boost pressure, exhaust gas pressure, EGR flow rate, and air/fuel ratio.

The method 400 may proceed to 404, which may include determining if an exhaust gas pressure is greater than a crankcase pressure. The exhaust gas pressure may be determined based on feedback from a pressure sensor, arranged in an exhaust passage between an engine and a turbine, to the controller. Similarly, the crankcase pressure may be determined based on feedback from a pressure sensor arranged in the crankcase. Additionally or alternatively, one or more of the exhaust gas pressure and crankcase pressure may be estimated based on one or more engine operating conditions. A look-up table comprising multiple inputs, including boost pressure, engine speed, spark timing, exhaust valve timing, and fuel injection timing. Additionally, the crankcase pressure may be tracked over time based on pressure increases and decreases due to piston oscillations, blow-by gases, and positive crankcase valve (PCV) openings. If the crankcase pressure is greater than exhaust gas pressure, then oil may leak from the crankcase to the combustion chamber, which may generate blue exhaust gas smoke and lead to engine degradation. The engine degradation due to oil leak may include cracking and the like.

If the exhaust gas pressure is greater than the crankcase pressure, then the method 400 may proceed to 406 to maintain current engine operating parameters. In this way, an oil leak may not occur under the current engine operating parameters.

If the exhaust gas pressure is not greater than the crankcase pressure by at least the threshold pressure, then the method 400 may proceed to 408, which may include adjusting one or more engine operating parameters. The one or more engine operating parameters may include adjusting an exhaust valve opening at 410, adjusting spark timing at 412, adjusting a wastegate position at 414, and adjusting an exhaust tuning valve position at 416.

Adjusting the exhaust valve opening at 410 may include adjusting the exhaust valve opening such that the exhaust valve opening is retarded. An exhaust gas pressure may increase in response to the retarded exhaust valve opening, thereby decreasing a likelihood of oil leaking from the crankcase to the exhaust passage. A magnitude of the retarding may be based on a current exhaust pressure and the crankcase pressure. For example, if the crankcase pressure is less than the current exhaust pressure by at least the threshold pressure (e.g., 2 kPa or 0.02 atm), then the exhaust valve opening timing may not be adjusted. However, if the current exhaust gas pressure is not greater than the crankcase pressure by the threshold pressure, then the exhaust valve opening may be retarded. In such an example, the exhaust valve opening may be increasingly retarded as the crankcase pressure approaches the current exhaust pressure. For example, the exhaust valve opening may be more retarded in response to a difference between the current exhaust pressure and the crankcase pressure being 0.5 kPa compared to a difference being 1.0 kPa. Additionally or alternatively, spark may be similarly retarded such that spark timing is more retarded as the difference between the current exhaust pressure and the crankcase pressure decreases toward zero.

In some examples, the controller may make a logical determination (e.g., regarding a position of an actuator of the exhaust valve) based on logic rules that are a function of exhaust pressure, cylinder pressure, piston position, and cam position. The controller may then generate a control signal that is sent to the exhaust valve actuator.

Additionally or alternatively, positions of a wastegate and compressor bypass valve (CBV) may be adjusted. The wastegate may be configured to bypass exhaust gas around a turbine. In this way, if the wastegate is adjusted to a more closed position, then exhaust pressure may increase. The CBV may be moved to a more open position, thereby allowing more intake air to bypass the compressor such that a current turbo speed (e.g., amount of boost) is maintained. A magnitude of the wastegate closure may be based on a difference between the current exhaust pressure and the crankcase pressure. As the difference decreases and the crankcase pressure approaches the current exhaust pressure, the wastegate may be moved to an increasingly closed position such that less exhaust gas may bypass the turbine, forcing more exhaust gas to flow through the turbine.

Additionally or alternatively, an exhaust tuning valve (ETV) may be adjusted to adjust exhaust gas pressure. In one example, the ETV may be used substantially similarly to exhaust tuning valve 172 of FIG. 1. The ETV may increase exhaust gas pressure by moving to a more closed position such that a constriction of an exhaust passage is increased. A magnitude of the closure of the ETV may be based on the difference between the current exhaust gas pressure and the crankcase pressure. Similar to the retardation of the exhaust valve opening, a magnitude of the closure of the ETV may increase as the difference between the current exhaust gas pressure and the crankcase pressure decreases. In this way, a cross-sectional flow through area of the exhaust passage may decrease.

At any rate, by adjusting one or more of the exhaust valve timing, spark timing, wastegate, and ETV, the exhaust gas pressure may be increased. The method 400 may proceed to 418, which may include determining if the current exhaust pressure is greater than the crankcase pressure. This may include determining if the exhaust gas pressure is greater than the crankcase pressure by at least the threshold pressure.

If the current exhaust pressure is not greater than the crankcase pressure by at least the threshold pressure, then the method 400 may proceed to 420, which may include adjusting engine operating parameters to a greater degree. For example, this may include further delaying the exhaust valve opening, retarding spark more, moving the wastegate to a more closed position, and moving the ETV to a more closed position compared to the adjustments at 410, 412, 414, and 416, respectively.

If the current exhaust pressure is greater than the crankcase pressure by the threshold pressure, then the method 400 may proceed to 422 to maintain current engine operating parameters. In this way, a magnitude of the exhaust operating parameter adjustments are not increased.

It will be appreciated that the methods of FIGS. 3 and 4 may be operated in tandem or individually. Additionally or alternatively, the adjustments described method 400 may be executed during method 300 in response to the determination of an oil leak being present.

Turning now to FIG. 5, it shows an engine operating sequence 500 illustrating the vehicle 5 executing methods 300 and 400 of FIGS. 3 and 4. Plot 505 illustrates if a vehicle is reversing, plot 510 illustrates if an exhaust gas color is blue, plot 515 illustrates if boost is active, plot 520 illustrates a crankcase pressure, large dash line 522 illustrates an exhaust gas pressure and small dash line 524 illustrates a threshold pressure, where large dashes are bigger than small dashes, plot 525 illustrates a spark timing, plot 530 illustrates a wastegate position, plot 535 illustrates an exhaust tuning valve (ETV) position, plot 540 illustrates an exhaust valve timing, and plot 545 illustrates an indicator lamp activity. The open and closed positions illustrated in the engine operating sequence 500 illustrate fully open and fully closed positions, respectively. The fully open position may correspond to a valve position where maximum fluid flow is allowed. Thus, the fully closed position may correspond to a valve position where fluid flow is prevented or a minimum fluid flow is allowed. A more open position may refer to a position that is closer to the fully open position than a previous position from which it moved. Time increases from a left to a right side of the figure.

Prior to t1, the vehicle is reversing (plot 505). As such, the imaging device may be visualizing a surrounding area behind the rear of the vehicle and may be unable to visualize the exhaust gas. Thus, it may be unknown if the exhaust gas is blue (plot 510). Boost is not active while the vehicle is reversing (plot 515) in the example of FIG. 5. The crankcase pressure is increasing (plot 520), as is the exhaust gas pressure (plot 522). The threshold pressure (524) may be less than and track the exhaust gas pressure. As such, the threshold pressure may be a fixed value representing a pressure less than the exhaust gas pressure by a minimum amount. In one example, the threshold pressure is less than the exhaust gas pressure by exactly 2.0 kPa. Spark timing may be between advanced and retarded (plot 525). The wastegate position may be fully open (plot 530) due to boost not being active. An ETV position may be fully open (plot 535). An exhaust valve timing may be between advance and retarded (plot 540). An indicator lamp may be off (plot 545).

At t1, the vehicle is no longer reversing and may be switched to a different gear. In this example, the vehicle may be switched to a drive gear. Between t1 and t2, the imaging device is direct to visualize exhaust gas smoke. The images of exhaust gas smoke captured by the imaging device may be analyzed similar to the analyzation described above with respect to method 400 of FIG. 4. In the present example, the exhaust gas does not have a threshold amount of blue color. As such, oil may not be leaking. Furthermore, boost may not be active. As such, it may be determined that oil may not be leaking during non-boost engine conditions (e.g., naturally aspirated conditions).

At t2, boost may be activated and the wastegate may move to a more closed position to direct at least some exhaust gas to the turbine. Between t2 and t3, the imaging device may visualize the exhaust gas during the boost engine conditions to determine if oil is leaking. As shown, the exhaust gas does not have a threshold amount of blue. Thus, it may be determined that both boosted and non-boost engine conditions are not leaking oil. The imaging device may continue to visualize exhaust gas while the vehicle is not reversing.

At t3, boost is no longer active. The exhaust gas pressure begins to decrease, however, the crankcase pressure remains relatively constant. Between t3 and t4, the crankcase pressure exceeds the threshold pressure such that the difference between the crankcase pressure and the exhaust gas pressure is less than 2.0 kPa. This may increase a likelihood of oil leaking from the crankcase to the exhaust gas. In response to the difference between the exhaust gas and the crankcase pressure being less than the threshold pressure, one or more engine operating parameters may be adjusted at t4. Specifically, to increase the exhaust gas pressure, spark timing is more retarded, the ETV position is more closed, and the exhaust valve timing may be more retarded. Between t4 and t5, the exhaust pressure increases and the crankcase pressure is now less than the exhaust pressure by at least the threshold pressure. As shown, boost is still inactive and as a result, the wastegate may not be adjusted to adjust the exhaust gas pressure. However, as described above, if boost is active and the difference between the crankcase pressure and the exhaust pressure is less than the threshold pressure, then the wastegate may be moved to a more closed position to increase exhaust pressure.

At t5, the vehicle may begin an extended driving operation. For example, between t5 and t6, the vehicle may drive 30,000 miles.

At t6, the vehicle is not reversing. The imaging device is imaging exhaust gas. Boost is inactive. Between t6 and t7, the images of the exhaust gas may be analyzed and it may be determined that the exhaust gas is not blue. As such, oil may not be leaking during non-boosted engine conditions.

At t7, boost may be active. The imaging device may capture one or more images of the exhaust gas, wherein the images may be analyzed for an amount of blue. The amount of blue in the exhaust gas images may exceed the threshold amount and it may be determined that the exhaust gas is blue. As such, oil may be leaking into the exhaust gas during boosted engine conditions. The indicator lamp may be activated. After t7, the indicator lamp may remain active until one or more of the amount of blue in the exhaust gas is decreased and the vehicle is serviced to remove the oil leak. Additionally or alternatively, one or more engine operating parameters may be adjusted in response to the exhaust gas being blue. For example, since the leak is during only boosted conditions, the turbo may be deactivated and only non-boosted engine operating conditions may be utilized until the leak is removed. Additionally or alternatively, boost may decrease in response to the exhaust gas being blue.

In this way, an imaging device may be utilized for separate functions during different conditions of a vehicle. By imaging exhaust gas with the imaging device, oil leaks may be mitigated onboard the vehicle to mitigate further degradations. The technical effect of adjusting engine operating parameters in response to the oil leak is to mitigate how much oil is leaked and degradation of engine components. As such, engine power output may be substantially preserved during the time between determining the oil leak and receiving maintenance.

A method comprising operating a reverse camera outside of a reverse driving condition, capturing one or more images of exhaust gas, and determining an amount of blue in the exhaust gas. A first example of the method further includes where the reverse camera captures a first surrounding area during the reverse driving condition, wherein the first surrounding area includes an area between 0.5 to 5 meters of a rear of a vehicle. A second example of the method, optionally including the first example, further includes where the reverse camera captures a second surrounding area outside of the reverse driving condition, wherein the second surrounding area includes an area within 0.5 meters of a rear of a vehicle. A third example of the method, optionally including the first and/or second examples, further includes where the second surrounding area further includes one or more tailpipes and exhaust gas emitting therefrom. A fourth example of the method, optionally including one or more of the first through third examples, further includes where the determining further comprises comparing the amount of blue to a threshold amount of blue, wherein the threshold amount of blue is empirically determined. The operating includes one or more of actuating and refocusing the reverse camera. A fifth example of the method, optionally including one or more of the first through fourth examples, further includes where reverse camera comprises a servomotor configured to actuate the camera 360° within a fixed plane. A sixth example of the method, optionally including one or more of the first through fifth examples, further includes where the capturing further includes capturing images of exhaust gas during boosted and non-boosted engine conditions, wherein the amount of blue in the exhaust gas is compared between the boost and non-boosted engine conditions.

A system comprising an engine configured to propel a vehicle, an imaging device arranged at a rear end of the vehicle, the rear end further comprising one or more tailpipes configured to emit exhaust gas of the engine to an ambient atmosphere, and a controller comprising instruction stored on non-transitory memory thereof that when executed enable the controller to capture images of the one or more tailpipes and exhaust gas during boost and non-boosted engine condition and determine an amount of blue in the images. A first example of the system further includes where the controller being enabled to compare the amount of blue to a threshold amount of blue, and where an oil leak is present if the amount of blue is greater than the threshold amount of blue. A second example of the system, optionally including the first example, further includes where oil is leaking during both the boosted and non-boosted engine conditions if the amount of blue is greater than the threshold amount of blue for images of both the boosted and non-boosted engine conditions. A third example of the system, optionally including the first and/or second examples, further includes where oil is leaking during only the boosted engine condition if the amount of blue in the image for the boosted engine condition is greater than the threshold amount and if the amount of blue in the image for the non-boosted engine condition is less than or equal to the threshold amount. A fourth example of the system, optionally including one or more of the first through third examples, further includes where oil is leaking during only the non-boosted engine condition if the amount of blue in the image for the non-boosted engine condition is greater than the threshold amount and if the amount of blue in the image for the boosted engine condition is less than or equal to the threshold amount. A fifth example of the system, optionally including one or more of the first through fourth examples, further includes where the imaging device is adjusted by a servomotor, the servomotor configured to direct the imaging device toward the one or more tailpipes. A sixth example of the system, optionally including one or more of the first through fifth examples, further includes where there are two tailpipes, and where the servomotor oscillates the camera to a first and a second of the tailpipes.

A method comprising determining an oil leak via analyzing images of exhaust gas during boosted and non-boosted engine condition captured by a reverse camera outside of a reverse driving condition and adjusting at least one engine operating parameters in response to the oil leak. A first example of the method, further includes where the reverse driving condition includes a rear gear being selected and a vehicle being propelled in a reverse direction, wherein the reverse direction is visible via the reverse camera. A second example of the method, optionally including the first example, further includes where displaying images of exhaust gas in response to the oil leak, the displaying including displaying a live feed of the reverse camera recording exhaust gas flowing out of one or more tailpipes. A third example of the method, optionally including the first and/or second examples, further includes where the adjusting includes adjusting a boost pressure in response to the oil leak corresponding to the boosted engine condition. A fourth example of the method, optionally including one or more of the first through third examples, further includes where the adjusting includes activating an indicator lamp.

A method comprising determining an oil leak via analyzing an exhaust gas color and adjusting at least one engine operating parameter in response to the oil leak and a pressure of a crankcase being within a threshold of an exhaust gas pressure. A first example of the method further includes where the oil leak is determined outside of a cold-start during a naturally aspirated engine operating condition. A second example of the method, optionally including the first example, further includes where the oil leak is determined during a boosted engine operating condition. A third example of the method, optionally including the first and/or second examples, further includes where the at least one engine operating parameter includes adjusting an exhaust valve timing, wherein the exhaust valve timing is retarded and where the exhaust valve timing is increasingly retarded in response to a difference between the exhaust gas pressure and the pressure of the crankcase decreasing. A fourth example of the method, optionally including one or more of the first through third examples, further includes where the at least one engine operating parameter includes adjusting an exhaust tuning valve position, wherein the exhaust tuning valve is moved to a more closed position, and where the exhaust tuning valve is increasingly closed in response to a difference between the exhaust gas pressure and the pressure of the crankcase decreasing. A fifth example of the method, optionally including one or more of the first through fourth examples, further includes where the at least one engine operating parameter includes adjusting a spark timing, wherein the spark timing is retarded, and where the spark timing is increasingly retarded in response to a difference between the exhaust gas pressure and the pressure of the crankcase decreasing.

A method comprising determining oil is leaking from a crankcase to a combustion chamber via analyzing exhaust gas outside of a cold-start during a non-boosted engine condition and retarding one or more of a spark timing and exhaust valve timing based on a difference between an exhaust gas pressure and a pressure of the crankcase. A first example of the method further includes where the spark timing is increasingly retarded as the pressure of the crankcase approaches the exhaust gas pressure. A second example of the method, optionally including the first example further includes where the exhaust valve timing is increasingly retarded as the pressure of the crankcase approaches the exhaust gas pressure. A third example of the method, optionally including the first and/or second examples, further includes where adjusting a position of an exhaust tuning valve arranged between a turbine and an emission control within an exhaust passage. A fourth example of the method, optionally including one or more of the first through third examples, further includes where the position of the exhaust tuning valve is more closed as the pressure of the crankcase approaches the exhaust gas pressure. A fifth example of the method, optionally including one or more of the first through fourth examples, further includes where the exhaust tuning valve is configured to obstruct at least a portion of the exhaust passage.

A system comprising a multi-cylinder engine comprising a turbocharger having a compressor arranged in an intake passage and a turbine arranged in an exhaust passage, an exhaust tuning valve arranged in the exhaust passage between the turbine and an emission control device, an imaging device arranged at a rear of a vehicle, where the imaging device visualizes an area exterior to the vehicle, and a controller with computer readable instructions stored on non-transitory memory thereof that when executed enable the controller to visualize exhaust gas via the imaging device during boosted and non-boosted engine conditions, analyze an amount of blue in the exhaust gas, determine an oil leak when the amount of blue is greater than a threshold amount of blue, and adjust one or more of a spark timing, an exhaust valve timing, and a position of the exhaust tuning valve. A first example of the system further includes where exhaust gas is visualized during combusting events of the multi-cylinder engine. A second example of the system, optionally including the first example, further includes where the imaging device is arranged above a tailpipe. A third example of the system, optionally including the first and/or second examples, further includes where a number of imaging devices is equal to a number of tailpipes. A fourth example of the system, optionally including one or more of the first through third examples, further includes where the amount of blue increases as an amount of oil in the exhaust gas increases. A fifth example of the system, optionally including one or more of the first through fourth examples, further includes where determining oil is not leaking in response to the amount of blue being less than or equal to the threshold amount. A sixth example of the system, optionally including one or more of the first through fifth examples, further includes where spark timing, exhaust valve timing, and the position of the exhaust tuning valve are adjusted in response to a crankcase pressure being within a threshold of an exhaust gas pressure when oil is not leaking to mitigate a likelihood of a future oil leak developing. A seventh example of the system, optionally including one or more of the first through sixth examples, further includes where the imaging device is a camera or video recorder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   determining an oil leak and a pressure of a crankcase being within a threshold of an exhaust gas pressure, the oil leak based on an exhaust gas color sensed via a reverse camera; and
   retarding an exhaust valve timing in response to the oil leak and the pressure of the crankcase being within the threshold, the exhaust valve timing increasingly retarded in response to a difference between the exhaust gas pressure and the pressure of the crankcase decreasing.

2. The method of claim 1, wherein the oil leak is determined outside of a cold-start during a naturally aspirated engine operating condition.

3. The method of claim 1, wherein the oil leak is determined during a boosted engine operating condition.

4. A method comprising:
   determining an oil leak and a pressure of a crankcase being within a threshold of an exhaust gas pressure, the oil leak based on an exhaust gas color sensed via a reverse camera; and
   adjusting at least one engine operating parameter in response to the oil leak and the pressure of the crankcase being within the threshold, wherein the at least one engine operating parameter includes adjusting a position of an exhaust tuning valve, wherein the exhaust tuning valve is moved to a more closed position, and wherein the exhaust tuning valve is increasingly closed in response to a difference between the exhaust gas pressure and the pressure of the crankcase decreasing.

5. The method of claim 1, further comprising adjusting a spark timing in response to the difference between the exhaust gas pressure and the pressure of the crankcase.

6. A method comprising:
   determining operating conditions after completion of a cold-start and without boosting operation, and, in response to said determined operating conditions being present, determining an amount of blue color in exhaust gas outside, and identifying an oil leak in response to the amount being greater than a threshold; and
   in response to said oil leak, retarding one or more of a spark timing and an exhaust valve timing based on a difference between an exhaust gas pressure and a pressure of a crankcase.

7. The method of claim 6, wherein the spark timing is increasingly retarded as the pressure of the crankcase approaches the exhaust gas pressure.

8. The method of claim 6, wherein the exhaust valve timing is increasingly retarded as the pressure of the crankcase approaches the exhaust gas pressure.

9. The method of claim 6, further comprising adjusting a position of an exhaust tuning valve arranged between a turbine and an emission control within an exhaust passage.

10. The method of claim 9, wherein the position of the exhaust tuning valve is more closed as the pressure of the crankcase approaches the exhaust gas pressure.

11. The method of claim 9, wherein the exhaust tuning valve is configured to obstruct at least a portion of the exhaust passage.

12. The method of claim 6, further comprising detecting boosted conditions, detecting an amount of blue color in exhaust during the boosted conditions, and indicating a turbocharger degraded condition in response to the amount of blue color in the exhaust during the boosted conditions.

* * * * *